United States Patent [19]

Chivens et al.

[11] Patent Number: 4,753,256
[45] Date of Patent: Jun. 28, 1988

[54] POOL CLEANER HOSE

[75] Inventors: Donald R. Chivens, Northridge; Greskovics, Paul, Manhattan Beach, both of Calif.

[73] Assignee: Alopex Industries, Inc., San Marcos, Calif.

[21] Appl. No.: 798,978

[22] Filed: Nov. 18, 1985

[51] Int. Cl.⁴ .................................................. B08B 3/02
[52] U.S. Cl. .................. 134/166 R; 134/172; 138/103
[58] Field of Search ............... 138/103, 122, 129, 144, 138/150, 154; 134/172, 167 R, 166 R; 405/172

[56] References Cited

U.S. PATENT DOCUMENTS

| | | |
|---|---|---|
| 2,731,040 | 1/1956 | Warburton . |
| 2,772,263 | 11/1955 | Beare et al. . |
| 2,975,791 | 3/1961 | Pansini ............................ 15/1.7 X |
| 2,994,104 | 8/1961 | Mittag . |
| 3,108,298 | 10/1963 | Gelinas ............................ 15/1.7 |
| 3,122,171 | 10/1960 | Britton et al. . |
| 3,199,541 | 8/1965 | Richitelli . |
| 3,255,780 | 6/1966 | Squirrell . |
| 3,273,600 | 9/1966 | Swan . |
| 3,477,891 | 11/1969 | Hawerkamp . |
| 3,495,628 | 2/1970 | Boender . |
| 3,542,078 | 11/1970 | Lykle . |
| 3,554,237 | 1/1971 | Pelley . |
| 3,575,729 | 4/1971 | Howard ............................ 15/1.7 X |
| 3,606,670 | 9/1971 | Wienard et al. . |
| 3,607,501 | 9/1971 | Okumura . |
| 3,679,531 | 7/1972 | Wienard et al. . |
| 3,815,639 | 6/1974 | Westerbarkey . |
| 3,846,202 | 11/1974 | Clarke . |
| 3,872,983 | 3/1975 | Roberts . |
| 3,890,181 | 6/1975 | Stent et al. . |
| 3,966,525 | 6/1976 | Steward . |
| 4,040,864 | 8/1977 | Steeves ..................... 134/167 R X |
| 4,062,380 | 12/1977 | Hofle . |
| 4,063,430 | 12/1977 | Lamy .............................. 405/172 X |
| 4,119,123 | 10/1978 | Samuels . |
| 4,121,624 | 10/1978 | Chen . |
| 4,149,924 | 4/1979 | Grobard . |
| 4,203,476 | 5/1980 | Vitellaro . |
| 4,209,043 | 6/1980 | Menzel . |
| 4,279,965 | 7/1981 | Elmqvist . |
| 4,346,484 | 8/1982 | Martin ..................... 134/167 R X |
| 4,356,582 | 11/1982 | Stephenson ..................... 15/1.7 |

Primary Examiner—Harvey C. Hornsby
Assistant Examiner—Frankie L. Stinson
Attorney, Agent, or Firm—Kelly, Bauersfeld & Lowry

[57] ABSTRACT

An improved pool cleaner hose is provided for use in supplying water under pressure to a water-powered in-the-pool cleaner device for swimming pools and the like. The hose is formed from one or more elongated spiral wound strips of flexible plastic material or the like with adjacent turns interconnected by a continuous laser weld to define an elongated, flexible, and relatively buoyant hose construction. The hose is coupled between a supply of water under pressure and the pool cleaner device, with weights of selected mass being mounted upon the hose at selected positions near the cleaner device to cause the hose to trail the cleaner device with a relatively low profile thereby minimizing drag effects upon the cleaner device as it moves throughout the pool.

5 Claims, 1 Drawing Sheet

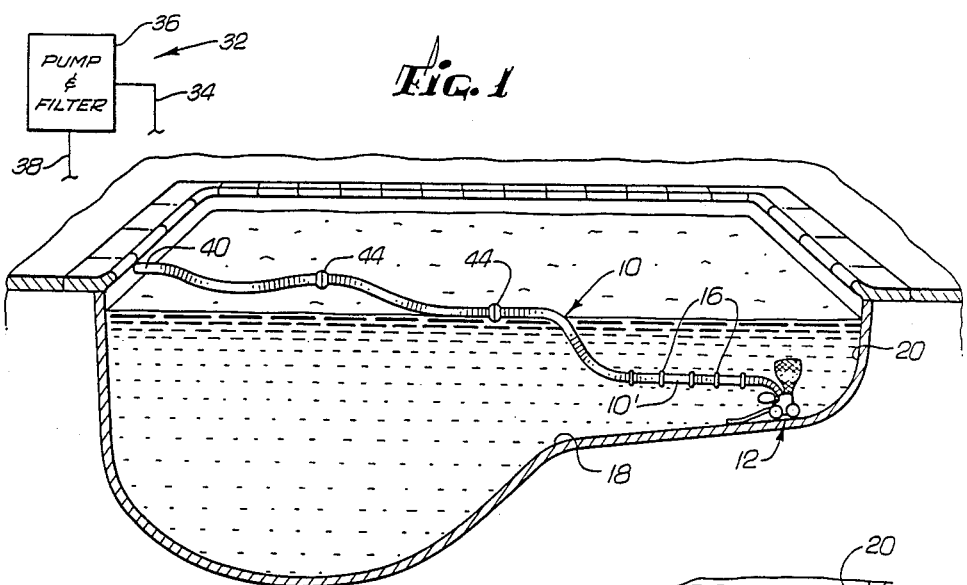

POOL CLEANER HOSE

BACKGROUND OF THE INVENTION

This invention relates generally to cleaner devices and related equipment for use in cleaning swimming pools and the like. More specifically, this invention relates to improvements in hoses for supplying water under pressure to an in-the-pool cleaner device.

Pool cleaner devices in general are relatively well known in the art for automated operation to assist in maintaining the cleanliness of a swimming pool or the like. Such cleaner devices are typically installed directly into the swimming pool and include water-powered drive means for travel in a generally random fashion throughout the pool. Vacuum apparatus and/or water spray jets are commonly included on the cleaner device and function to dislodge dirt and debris within the swimming pool for collection within a small filter bag carried by the cleaner device or, in the alternative, for suspension within the pool water and subsequent circulation to a conventional swimming pool filtration system. Examples of such water-powered in-the-pool cleaner devices are described in U.S. Pat. Nos. 3,972,339; 3,936,899; and 3,822,754. See also commonly assigned application Ser. No. 574,293, filed Jan. 26, 1984, now U.S. Pat. No. 4,558,479, issued Dec. 17, 1985.

Pool cleaning devices of the above-described type are adapted for connection to a supply of water under pressure, such as the pump discharge flow from the pool filtration system, by means of an elongated flexible cleaner hose. Such cleaner hoses are typically constructed from lightweight and preferably inexpensive plastic material capable of withstanding prolonged exposure to the swimming pool water and related temperature variations without significant incidents of failure. In one known form, the cleaner hose is constructed from elongated extruded plastic tubing with a plurality of floats installed along the length thereof to insure hose buoyancy, together with a plurality of swivel couplings to prevent hose twisting as the cleaner device moves throughout the pool during operation. For some pool cleaner devices, however, extruded tubing hoses do not exhibit sufficient flexibility to trail the cleaner device without imposing significant drag and other forces upon the cleaner device, wherein such forces can adversely impact traction between the wheels of the cleaner device and adjacent pool surfaces, as well as the efficiency of debris vacuuming apparatus.

Alternative cleaner hose configurations have been proposed in the form of a so-called spiral wound hose constructed from an elongated strip of lightweight plastic material with adjacent strip turns interconnected to define a flexible hose construction. Such cleaner hoses advantageously can be made from relatively buoyant plastic materials to eliminate the need for separate hose floats. Moreover, spiral wound hoses tend to exhibit a relatively high degree of flexibility during operation with a corresponding reduction in drag and other forces applied to the cleaner device as it moves through the water of the swimming pool. However, spiral wound hoses have not exhibited satisfactory longevity within the chemical-treated water of a swimming pool, particularly when that water becomes relatively warm, resulting in relatively frequent incidents of hose rupture and failure. Moreover, the buoyant characteristics of spiral wound hoses results in a relatively high hose profile during cleaner operation to create significant drag disruptive to vacuuming efficiency and wheel traction. This drag can have especially pronounced effects when the pool cleaner device is adapted for operation with a relatively low pressure supply of water, as described in the above-referenced application Ser. No. 574,293.

There exists, therefore, a significant need for an improved cleaner hose for use with in-the-pool cleaner devices and the like wherein the hose exhibits relatively high flexibility and longevity in use, and further wherein the hose is adapted to impart substantially minimum drag and other forces to the pool cleaner during cleaner operation. The present invention fulfills these needs and provides further related advantages.

SUMMARY OF THE INVENTION

In accordance with the invention, an improved cleaner hose is provided for use in combination with pool cleaners and the like of the type adapted for water-powered movement throughout a swimming pool to dislodge dirt and debris from submerged pool surfaces. The improved pool cleaner hose comprises a lightweight and flexible hose formed from one or more spiral wound strips of plastic or the like which are laser welded together. The hose is adapted for connection between the pool cleaner and a supply of water under pressure, such as the pump discharge side of a swimming pool filtration system. A plurality of weights are mounted at selected positions near the pool cleaner causing the hose to trail the pool cleaner during operation with a relatively low profile configuration imparting minimum drag to the pool cleaner.

In a preferred form of the invention, the improved pool cleaner hose is constructed from at least one and preferably two elongated lightweight and flexible strips of plastic material which are spiral wound into the geometry of an elongated hose. Adjacent spirals or turns of the plastic strips are connected together by an elongated, continuous laser weld which permanently and integrally joins said adjacent turns together. In the preferred geometry, a generally U-shaped and inverted cap strip overlies the juncture of radially outwardly projecting ribs on adjacent spiral turns of a base strip and is integrally coupled to both of the ribs by the same continuous laser weld.

The elongated spiral wound flexible plastic hose is relatively buoyant within the pool water and is connected between the cleaner and the water pressure supply, typically by connection to a wall fitting along one sidewall of the swimming pool. Hose weights are mounted at selected positions along a downstream end section of the hose generally near the pool cleaner to cause the hose to trail the pool cleaner with a substantially horizontal submerged orientation as the pool cleaner travels through the water during operation. Accordingly, the cleaner hose exhibits a relatively low frontal profile in the direction of cleaner travel and tends to trail the cleaner with a substantially longitudinal motion to impart minimum drag upon the pool cleaner. Traction between cleaner wheels and submerged pool surfaces as well as the efficiency of cleaner vacuum apparatus are thus enhanced.

In accordance with the preferred hose weight arrangement, the hose weights are mounted in spaced relation along approximately thirty percent of the length of the pool cleaner hose at the end thereof adjacent the pool cleaner. The number, mass, and positions of the weights are chosen to maintain a substantial portion of the hose length in a generally horizontal attitude immediately behind and slightly above the pool cleaner and to prevent the hose from floating to the water's surface until a distance from the pool cleaner of at least about thirty percent of the total hose length.

Other features and advantages of the present invention will become more apparent from the following detailed description, taken in conjunction with the acccompanying drawings, which illustrate, by way of example, the principles of the invention.

BRIEF DESCRIPTION OF THE DRAWINGS

The accompanying drawings illustrate the invention. In such drawings:

FIG. 1 is a fragmented somewhat diagrammatic view depicting an improved pool cleaner hose embodying the novel features of the invention and shown in operative connection with an in-the-pool cleaner device;

FIG. 2 is an enlarged fragmented sectional view illustrating constructed details of the cleaner hose;

FIG. 3 is an elevation view depicting a preferred hose weight for use with the cleaner hose; and FIG. 4 is an enlarged fragmented diagrammatic view illustrating operation of the pool cleaner coupled to the cleaner hose of the invention.

DETAILED DESCRIPTION OF THE PREFERRED EMBODIMENT

As shown in the exemplary drawings, an improved cleaner hose referred to generally by the reference numeral 10 is provided for use in combination with an in-the-pool cleaner device 12 for cleaning a swimming pool 14 or the like. The cleaner hose 10 comprises a spiral wound, laser welded hose having a plurality of weights 16 mounted thereon to provide a highly flexible, buoyant hose construction for trailing the cleaner 12 in a relatively low profile, minimum drag configuration.

The pool cleaner 12 is designed for water-powered, in-the-pool operation for generally random travel over the floor 18 and submerged sidewalls 20 of the swimming pool 14 to dislodge and/or collect accumulated dirt, grit, and the other debris.

More specifically, as depicted in FIGS. 1 and 4, the pool cleaner generally comprises a housing 22 supported by drive wheels 24 for rolling movement in a random path over the floor and sidewalls of the swimming pool. Water under pressure is supplied to the cleaner housing 22 via the improved cleaner hose 10 to power an hydraulic drive train (not shown) mounted within the housing for rotationally driving the wheels 24. In addition, the supply of water under pressure operates a cleaner vacuum apparatus including an open upright suction mast 26 through which pool water and debris beneath the cleaner housing 22 are vacuumed upwardly into a water-pervious debris collection bag 28. A trailing sweep hose 30 is also normally provided through which a jet of water issues to disturb and suspend sediment within the body of pool water. Pool cleaners of this general type are described in more detail in U.S. Pat. No. 3,972,339 and in commonly assigned application Ser. No. 574,293, now U.S. Pat. No. 4,558,979 issued Dec. 17, 1985 which are incorporated by reference herein.

In normal operation, a pool cleaner 12 of the above-described type travels randomly throughout the swimming pool 14 to vacuum sediment, such as dirt, grit, leaves and other debris, from the floor 18 and sidewalls 20 of the swimming pool. Relatively large debris is collected within the debris collection bag 28 which can be removed periodically for debris disposal, whereas fine particulate matter is suspended within the pool water. As is known in the art, such suspended matter can then be removed from the pool water by a conventional filtration system 32 including a suction conduit 34 for circulating the water through pump and filter components 36 prior to return of the filtered water to the pool through a return conduit 38. The pool cleaner hose 10 is normally coupled to part or all of the return conduit flow via a suitable pool wall fitting 40 for supplying the returned water to the pool cleaner 12 via a water supply mast 42 on the pool cleaner which is connected to the hose by a suitable fitting.

The improved cleaner hose 10 of the present invention advantageously provides a relatively lightweight, buoyant, and highly flexible hose construction for supplying the water under pressure to the in-the-pool cleaner 12. The cleaner hose 10 advantageously avoids the use of conventional prior art floats and provides a high degree of hose flexibility to maximize freedom of cleaner travel substantially in the absence of drag due to bending of the hose. One or more swivel joints 44 may be provided along the length of the hose to prevent significant hose twisting during cleaner travel.

The improved cleaner hose 10 is shown best in FIG. 2 and is formed from lightweight spiral wound plastic material. More particularly, in the illustrative form, the cleaner hose 10 comprises a spiral wound base strip 46 of an elongated and preferably extruded plastic material, such as polyethylene or any other suitable plastic composition or mixture thereof. The base strip 46 has a generally U-shaped crosssectional geometry including an inboard web 48 joined at opposite side margins to a pair of radially outwardly projecting and generally parallel ribs 50. These ribs 50 in turn carry at their outer ends relatively short lips 52 extending in short directions toward one another.

The hose 10 is formed by winding the base strip 46 onto a mandrel (not shown) in a spiral or helical configuration with the ribs 50 of each spiral turn disposed in substantially abutting, back-to-back relation with adjacent ribs on adjacent turns of the base strip. The back-to-back pairs of ribs 50 on adjacent base strip turns are coupled together by a simultaneously spiral wound cap strip 54 which is also formed from a lightweight and preferably extruded plastic material, such as polyethylene or the like. The cap strip 54 has an outboard wall 56 wrapped in overlying relation about the juncture of the rib pairs on adjacent spiral turns, with inwardly radiating and generally parallel legs 58 on the wall 56 projecting radially inwardly short distances in axially outboard positions relative to the lips 52 on the base strip 46. Importantly, as shown best in the enlarged region of FIG. 2, the cap strip legs 58 are shorter than the ribs 50, and the axial span between the legs 58 is selected for relatively close reception of the adjacent pair of ribs 50 and their lips 52. This orients the three-component juncture of the adjacent ribs 50 and the cap strip outboard wall 56 close to each other for interconnection in a positive and permanent leak-free manner by a continuous laser weld 60. Such laser weld integrally joins the components together with sufficient structural integrity to withstand normal water supply pressures during use. Moreover, the laser weld connection is resistant to deterioration upon constant exposure to chemical-treated swimming pool water and the temperature variations thereof.

The spiral wound, laser welded hose 10 is coupled between the pool wall fitting 40 and the pool cleaner water supply mast 42, as described above, for supplying the water under pressure to the pool cleaner 12. As shown best in FIG. 1, the cleaner hose 10 is designed by material selection to float upon the water thereby eliminating the need for conventional hose float devices. However, for optimum cleaner performance, a downstream end section 10' of the hose adjacent the pool cleaner is weighted for controlled and submerged travel behind the pool cleaner 12.

More particularly, the downstream end section 10' of the hose 10 is weighted in the vicinity of the pool cleaner 12 by the plurality of spaced-apart weights 16. In the preferred form, these weights 16 comprise garter springs of selected mass and a length to fit or wrap circumferentially about the hose 10 in a slightly stretched condition. One end of each spring weight is conveniently tapered to a reduced cross-sectional size to fit securely within the open opposite end of the spring weight, as shown in dotted lines in FIG. 3. When placed under tension in wrapped relation about the hose, the coils of the spring tend to lockingly interengage to hold the spring weight in place.

The weights 16 are installed upon the hose 10 to orient the downstream end section 10' adjacent the pool cleaner in a generally horizontal attitude beyond and normally slightly above the housing 22 of the pool cleaner, typically about 12 to 18 inches above the pool floor 18. In this horizontal attitude, the hose presents a relatively low vertical or frontal profile resisting forward cleaner movement through the water thereby imparting a substantially minimum drag to the hose cleaner and enhancing freedom of cleaner movement. This reduction in drag enhances traction between the cleaner wheels 24 and the pool surfaces, particularly the front wheel which is otherwise tipped upwardly by such rearward-acting drag. Moreover, reduced drag maintains the lower end of the suction mast 26 close to the pool surfaces for optimized vacuum operation. The hose 10 tends to travel through the pool water substantially longitudinally with respect to hose axis to further minimize hose resistance or drag.

Although the number and precise location of the hose weights 16 may vary, it has been found that best pool cleaner operation is achieved when the weights are mounted over approximately thirty percent of the total hose length at the downstream section. More particularly, the weights are installed to cause about thirty percent of the hose adjacent the cleaner to assume a substantially horizontal orientation for a substantial length behind the pool cleaner housing. Such weighting of the downstream end section essentially imparts a near neutral buoyancy thereto during cleaner operation for longitudinal hose travel in a submerged position.

As shown in FIG. 4, the highly flexible cleaner hose advantageously improves wheel traction as the pool cleaner climbs, for example, upwardly through a curved transition region of the pool between the floor 18 and a submerged sidewall 20. More particularly, as the pool cleaner climbs upwardly through the curved transition region, the low profile position of the hose does not lift upwardly upon the rear wheel but instead applies an effective downward force to the rear wheel for improved rear wheel traction engagement with the transition region. As a result, climbing capability of the cleaner is enhanced for better cleaning of the pool sidewalls.

The improved pool cleaner hose 10 of the present invention thus provides a lightweight, flexible, and relatively buoyant construction adapted for long service life in swimming pool water and the like. When weighted as described, the hose presents a low profile geometry for imparting minimum drag to the pool cleaner during operation.

A variety of modifications and improvements to the invention described herein are believed to be apparent to those skilled in the art. Accordingly, no limitation on the invention is intended by way of the description and drawings, except as set forth in the appended claims.

What is claimed is:

1. A pool cleaner hose assembly for use in combination with a water-operated pool cleaner and the like adapted to travel over the submerged floor of a swimming pool, said hose assembly comprising:
    an elongated flexible buoyant hose for connection to the pool cleaner to supply water under pressure to the pool cleaner, said hose having a downstream end section generally adjacent the pool cleaner; and
    means for orienting said downstream end section to trail the pool cleaner during operation with a submerged low profile and substantially longitudinal motion spaced above the floor of the pool;
    said orienting means comprising at least one spring weight wrapped about said hose on said downstream end section to submerge said downstream end section generally horizontally behind the pool cleaner during pool cleaner operation.

2. The pool cleaner hose of claim 1 wherein said orienting means comprises a plurality of weights of selected mass mounted in spaced relation along said downstream end section of said hose.

3. The pool cleaner hose assembly of claim 2 wherein said downstream end section extends for about thirty percent of the total length of said hose.

4. The pool cleaner hose assembly of claim 1 wherein said hose is a spiral wound, laser welded hose.

5. A pool cleaner hose assembly for use with a water-operated pool cleaner and the like, said hose assembly comprising:
    an elongated flexible buoyant hose for connection to the pool cleaner to supply water under pressure to the pool cleaner, said hose having a downstream end section generally adjacent the pool cleaner; and
    a plurality of weights of selected mass mounted along said downstream end section of said hose for orienting said downstream end section in a substantially horizontal attitude behind and slightly above the pool cleaner during pool cleaner operation whereby said hose presents a submerged and relatively low frontal profile to impart minimal drag on the pool cleaner during operation.

* * * * *